United States Patent [19]

Barnett

[11] Patent Number: 6,145,020
[45] Date of Patent: Nov. 7, 2000

[54] MICROCONTROLLER INCORPORATING AN ENHANCED PERIPHERAL CONTROLLER FOR AUTOMATIC UPDATING THE CONFIGURATION DATE OF MULTIPLE PERIPHERALS BY USING A FERROELECTRIC MEMORY ARRAY

[75] Inventor: Philip C. Barnett, Clanfield, United Kingdom

[73] Assignee: Advanced Technology Materials, Inc., Danbury, Conn.

[21] Appl. No.: 09/078,952

[22] Filed: May 14, 1998

[51] Int. Cl.$^7$ ........................................................ G06F 13/00
[52] U.S. Cl. ................................ 710/8; 710/10; 713/100; 326/39
[58] Field of Search ................................... 710/8, 13, 10, 710/62; 395/275, 375, 481, 500; 711/4, 103; 326/37, 38, 39; 713/100

[56] References Cited

U.S. PATENT DOCUMENTS

| | | | |
|---|---|---|---|
| 4,791,603 | 12/1988 | Henry | 364/900 |
| 4,803,623 | 2/1989 | Klashka et al. | 364/200 |
| 4,972,470 | 11/1990 | Farago | 380/3 |
| 5,109,503 | 4/1992 | Cruickshank et al. | 395/500 |
| 5,198,706 | 3/1993 | Papaliolios | 326/37 |
| 5,237,699 | 8/1993 | Little et al. | 714/23 |
| 5,253,181 | 10/1993 | Marui et al. | 364/489 |
| 5,379,382 | 1/1995 | Work et al. | 395/275 |
| 5,402,014 | 3/1995 | Ziklik et al. | 326/37 |
| 5,408,624 | 4/1995 | Raasch et al. | 395/375 |
| 5,455,923 | 10/1995 | Kaplinksy | 395/481 |
| 5,535,406 | 7/1996 | Kolchinsky | 395/800 |
| 5,572,572 | 11/1996 | Kawan et al. | 379/98 |
| 5,574,388 | 11/1996 | Barbier et al. | 326/41 |
| 5,590,305 | 12/1996 | Terrill et al. | 395/430 |
| 5,684,980 | 11/1997 | Casselman | 395/500 |
| 5,758,127 | 5/1998 | MacAulay et al. | 395/500 |
| 5,799,203 | 8/1998 | Lee et al. | 395/828 |
| 5,812,867 | 9/1998 | Basset | 395/800.01 |
| 5,862,375 | 1/1999 | Gephardt | 713/1 |
| 5,890,199 | 3/1999 | Downs | 711/106 |
| 5,892,942 | 4/1999 | Ohnishi et al. | 375/651 |
| 5,896,338 | 4/1999 | Landgraf et al. | 365/226 |
| 5,936,879 | 8/1999 | Brouwer et al. | 365/145 |

FOREIGN PATENT DOCUMENTS

2180382B 11/1989 United Kingdom.

OTHER PUBLICATIONS

Mead and Conway, *Introduction to VLSI Systems*, pp. 237–242.

*Primary Examiner*—Thomas C. Lee
*Assistant Examiner*—Chun Cao
*Attorney, Agent, or Firm*—Oliver A.M. Zitzmann; Steven J. Hultquist

[57] ABSTRACT

The present invention is an enhanced peripheral controller communicating between a microcontroller and multiple peripherals that increases the speed with which configuration data sets are loaded. The enhanced peripheral controller includes a programmable logic array (PLA) and an FeRAM array. A reconfigurable peripheral controller is programmed onto the programmable logic array from a configuration data set for one of multiple peripherals. The reconfigurable peripheral controller is reprogrammed each time a new peripheral is connected to the microcontroller. The FeRAM array contains the configuration data set for programming the reconfigurable peripheral controller onto the programmable logic array. The FeRAM will receive a different configuration data set for each different peripheral to be programmed onto the PLA. Because the FeRAM operates at the speed of RAM, it receives the configuration data set for each peripheral on the fly as the microcontroller operates. In addition, the microcontroller and FeRAM cooperate to reprogram the reconfigurable peripheral controller on the fly for each different peripheral.

15 Claims, 4 Drawing Sheets

MICROCONTROLLER INCORPORATING AN ENHANCED PERIPHERAL CONTROLLER FOR AUTOMATIC UPDATING THE CONFIGURATION DATE OF MULTIPLE PERIPHERALS BY USING A FERROELECTRIC MEMORY ARRAY

BACKGROUND OF THE INVENTION

1. Field of the Invention

The present invention relates to a microcontroller and more particularly to a peripheral controller which is connected between the microcontroller and the peripheral equipment of the system.

2. Description of the Related Art

The flexibility of any microcomputer system is determined by the number and variety of the peripheral devices that can be connected to and used by the processor of the host computer system. Desk top microcomputers consist essentially of a host computer system having a microprocessor, a memory and a direct memory access controller, interconnected by a system of busses comprised of an address bus, a data bus and a control bus, together with interfaces to connect the host computer system to peripheral devices.

The peripheral devices of such systems can be used to provide input data (e.g. a scanner) for the microprocessor or to accept output data (e.g. a printer) from the microprocessor. Peripheral devices are also used for file storage that the microprocessor can both read from and write to.

In order to connect a peripheral device to the microprocessor bus system a peripheral interface is required for each peripheral device. Externally each interface takes the form of an electrical connector socket that brings the electronic signals, at the appropriate voltage levels, to the specified pin positions. Internally a peripheral interface is required to provide an intercommunication mechanism allowing the microprocessor to operate and communicate with the peripheral device using control and data signals on the microprocessor bus. The peripheral interface may be a dedicated interface arrangement, specific to a peripheral device, or a general purpose interface, usable with one of a number of different peripheral devices. There are two main types of general purpose interfaces: parallel and serial.

The parallel interface comprises a number of data ports (typically eight or sixteen) permitting the transfer of eight or sixteen bit words simultaneously, together with data flow control and status signal paths. This type of parallel interface is used for keyboard and printer interfaces, for example, and can be adapted for use with mass storage devices, robot arms, motors, valves or lamp-displays. One such interface, originally developed for printers, is referred to as the Centronics interface.

The serial interface uses a single wire for transmitting data one bit at a time to a receiver. Serial interfaces normally conform to internationally agreed standards (such as RS-232C or RS-449) which among other things, specify connector size, allocation of pins, voltage levels and communication protocols (e.g. rates of transmitting bits). RS-232C interfaces usually provide both a transmitter and a receiver circuit which are capable of independent and simultaneous operation.

Clearly, the parallel and serial general purpose interfaces provide a restriction upon the efficiency of the operation of a particular peripheral device which would not be applied if a dedicated interface was provided for each peripheral device. With a general purpose interface, the specified interface protocols have to be conformed to regardless of the most efficient protocol for the specific peripheral device. However, it becomes physically difficult and expensive to provide discrete dedicated interfaces for the wide range of peripheral devices which may be used with a desk top microprocessor system. Indeed most personal computers are only provided with a limited number, two with expansion up to six, of external peripheral interface connection points.

U.S. Pat. No. 5,379,382 discloses a peripheral controller suitable for providing a dedicated interface between a microprocessor and a selected peripheral device from a group of peripheral devices. The peripheral controller can then be reconfigured as needed to provide a dedicated interface between a second peripheral of the group of peripherals and the microprocessor.

It would be useful to increase the speed at which the peripheral controller switches between different peripherals by increasing the peripheral controller's ability to quickly load different configuration data sets for different peripherals.

SUMMARY OF THE INVENTION

The present invention is an enhanced peripheral controller communicating between a microprocessor and multiple peripherals that increases the peripheral controller's ability to quickly load different configuration data sets for different peripherals. The enhanced peripheral controller includes an FERAM array and a programmable logic array (PLA). The FeRAM contains a configuration data set for a peripheral selected to communicate with the microprocessor. The microprocessor cooperates with the FERAM to program the configuration data set into the PLA on the fly to create a reconfigurable peripheral controller to provide communication between the microprocessor and the selected peripheral. The reconfigurable peripheral controller is reconfigured on the fly each time a new one of the peripherals is selected to communicate with the microprocessor. The microprocessor reads a different configuration data set for each of the selected multiple peripherals into the FERAM on the fly as the microprocessor operates. The microprocessor, FERAM, and reconfigurable peripheral controller are able to operate on the fly because FERAM operates at the speed of RAM.

A second inventive feature is the use of the enhanced peripheral controller with the FeRAM array to complement the advantages of using FeRAM for the memory in the microcontroller. The memory in the microcontroller is nonvolatile, reprogrammable and operates with the speed of RAM. These same advantages with the FeRAM array allow the enhanced peripheral controller to work at the speed of the microprocessor and create a microcontroller that reconfigures the enhanced peripheral controller so that different peripherals may be switched on the fly as the microcontroller operates.

DETAILED DESCRIPTION OF THE INVENTION

U.S. Pat. No. 5,379,382 incorporated herein by reference shows a prior art peripheral controller suitable for connecting a selected peripheral device from a group of peripheral devices to a computer system which has a processor, a memory and a direct memory access controller interconnected by a system control bus. In this patent each time a peripheral is to be switched a new set of configuration data for the new peripheral must be read from the host computer into the peripheral controller. This is very slow.

Figure 1:
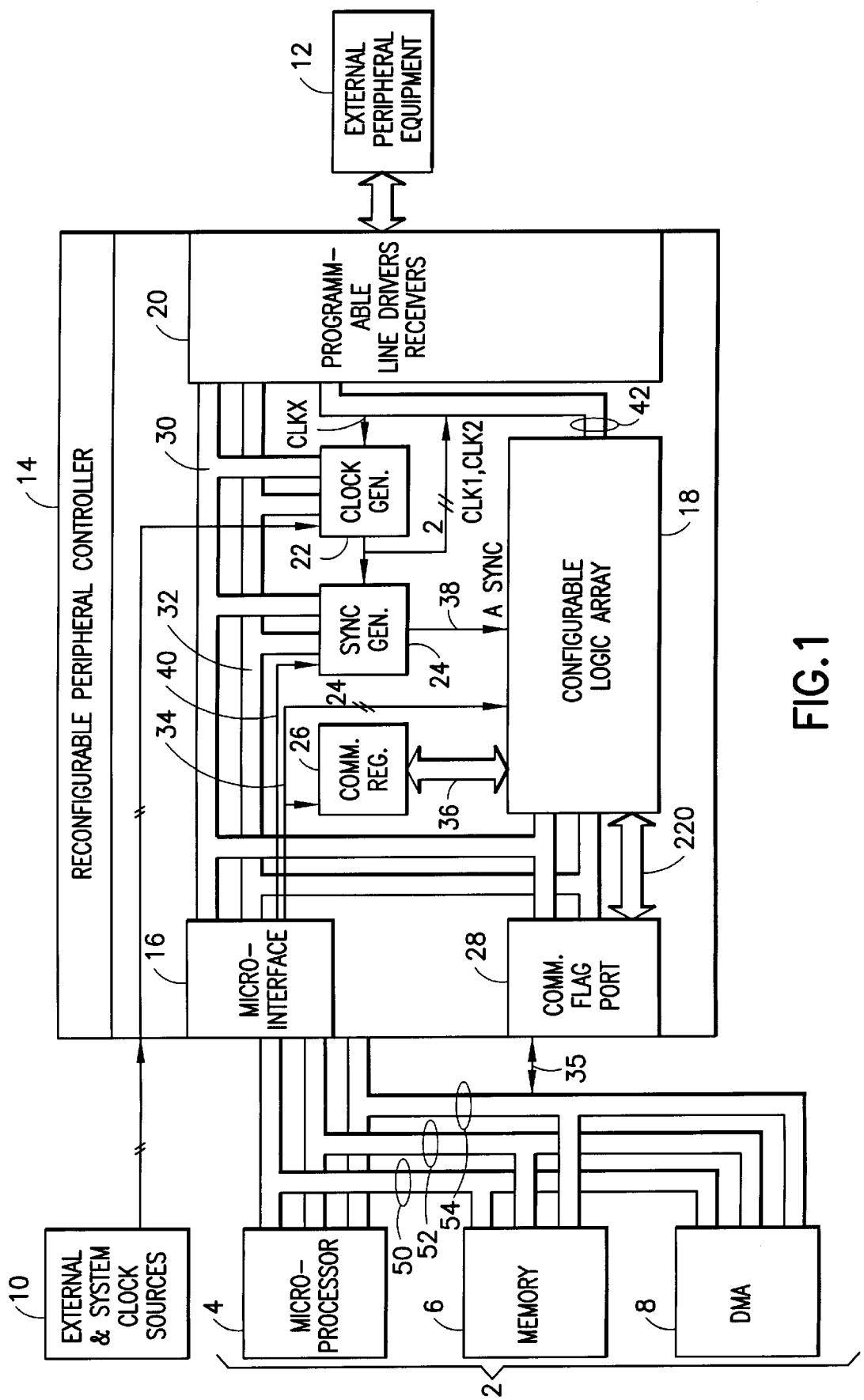
FIG. 1 is a block diagram of a prior art reconfigurable peripheral controller.

FIG. 1 shows the configurable peripheral controller of U.S. Pat. No. 5,379,382 being used in a conventional microprocessor system 2, composed of a microprocessor 4, a memory 6 and a direct memory access controller DMA 8. The system 2 also contains a pair of external clock sources 10 that, for the purposes of this embodiment, may be both the microcomputer system clock and an external reference crystal oscillator. The microcomputer system 2 communicates with external peripheral equipment 12 via a re-configurable peripheral controller 14 that can be configured to act as an interface between the microcomputer system 2 and a particular peripheral device. That is, data is transferred between memory address space of the microprocessor 4 and the peripheral equipment 12. The format, (data ordering, timing, error check, voltage levels etc.) for each data transfer is varied to suit the particular requirements of an individual piece of peripheral equipment. The microprocessor 4 loads configuration data into the re-configurable peripheral controller 14 and it is this configuration data which determines the precise data format for the transfer.

There are two broad types of data used by the system of the invention:

1. Configuration Data. This data is used to configure the re-configurable peripheral controller 14 to control its performance to transfer data to and from a peripheral device in a particular format (or standard). Each configuration of the peripheral controller 14 requires the loading of the peripheral controller with a configuration file made up of a number of configuration data words.

2. Interface Data. This data is the data to be transferred to and from the particular peripheral device. It may be the data to be transferred between the microcomputer system 2 and die peripheral equipment 12 or it may be an instruction to perform a particular operation in the interface, e.g. initiate a transfer or terminate a transfer.

The re-configurable peripheral controller 14 comprises a microprocessor interface 16, a configurable logic array 18, programmable line drivers/receivers 20, a clock generator 22, synchronization signal generator 24, communication registers 26 and a communication flag port 28.

The configurable logic 18 may, for example, be of a form previously described in U.K. Pat. No. GB 2180382B. This describes a configurable logic device composed of an array of logic cells in the form of NAND gates and latches and referred to as a dynamically programmed logic device. Complex logic functions can be implemented by interconnecting these logic elements. The interconnect is realized utilizing switches controlled by storage nodes/random access memory cells.

The microprocessor interface 16 is connected to the microprocessor 4 of the host system 2 via an address bus 50, a data bus 52 and a control bus 54. The microprocessor interface 16 receives configuration data from the host microcomputer system 2 and directs the configuration data to each of functional blocks described above. The data is directed by means of a configuration control bus 30 and an internal data bus 32. In this way, the peripheral controller 14 can be configured to implement a particular interface depending on the requirements of the particular piece of peripheral equipment to be connected.

The flag port circuitry 28 is configured under the control of data supplied to it by the configuration control bus 30 and data bus 32. The flag port circuitry 28 provides a control communication interface between the user configured peripheral controller 14 and the host microcomputer system 2. The peripheral controller 14 uses the flag port circuitry 28 to indicate that it requires attention from the host microcomputer system 2. The flag port circuitry 28 is connected to the direct memory access (DMA) controller 8 over DMA request/acknowledge and interrupt request signal paths 35 of the host microcomputer system. The re-configurable peripheral controller 14 can be controlled so that its internal circuits can be disabled by means of the microprocessor interface 16 when the particular interface is not active. It is possible, during a configuration initialization operation, that spurious logic states and levels can be transmitted to the direct memory access controller 8 via the interrupt-signals path 35. This can cause the microprocessor to halt and, therefore, circuitry is provided to force the lines tristate.

Interface data (i.e. the data involved in a peripheral transfer operation) is transferred between the microprocessor interface 16 and the configurable logic array 18, by way of the communication registers 26. The data is read/written to the communication registers 26 by means of the internal data bus 32 under the control of register control (read/write) signals generated by the microprocessor interface 16 and transmitted on a communication register control bus 34. This interface data is then transferred to and from the logic array 18 on the communication register bus 36. The communication registers 26 are configurable by means of the configuration control bus 30 and internal data bus 32. The communication registers 26 can be configured to be read or write only or bi-directional. The read/write signals supplied to the communication registers 26 along the bus 34 are also supplied to the configurable logic array 18. In this way in operation on a peripheral transfer the interface circuit implemented by the configurable peripheral controller 14 can determine that transfers have taken place and also that data is valid.

The synchronization signal generator 24 produces an output pulse along line 38 which is synchronous to the internal system clocks produced by-the clock generator 22 in response to an access to the communication registers 26. This allows the re-configurable peripheral controller 14 to operate totally asynchronously from the host microcomputer system 2.

In operation, the particular interface circuit implemented by the configured peripheral controller 14 can thus be operated as a clocked synchronous system running asynchronously to the host microcomputer system. The problem of metastable states occurring when communicating between two systems operating asynchronously is well documented (see for example Mead & Conway, introduction to VLSI Systems, P237–242). To avoid this, a signal is produced by the microprocessor interface 16 indicating that an access to the communication registers 26 has taken place. This signal is applied to the synchronization signal generator 24 over lead 40 which in turn produces a resolved output pulse a few clock cycles later. The resolved output pulse is input into the configurable logic array 18.

The clock generator 22 performs a frequency synthesis function. The clock generator can be configured to produce output clock signals at a different, but related, frequency to an input clock. There are three sources of input clock:
1. External crystal oscillator 10 or other reference.
2. Host microcomputer system clock 10.
3. An internal clock signal distributed on a configurable interconnect bus 42 which interconnects the configurable logic array 18 and the programmable line drive receivers 20.

This arrangement allows different clock rates and data transfer rates, specified in many interface standards, to be supported by the re-configurable peripheral controller 14. The clock outputs from the clock generator 22 drive the synchronization pulse generator 24 and also the configurable logic array 18 by way of the configurable interconnect bus 42.

The above described peripheral controller contemplates that a configuration data set is programmed onto a programmable logic array for one of multiple peripherals. The reconfigurable peripheral controller is reconfigured each time it is reprogrammed to switch the peripheral corresponding to the programmed configuration data set to be connected to the microprocessor.

The present invention builds on the peripheral controller of FIG. 1 to provide a microprocessor that has an enhanced peripheral controller that works with several different peripherals to switch between the peripherals on the fly. To enable the enhanced peripheral controller to switch between different peripherals on the fly, the peripheral controller technology, as described in FIG. 1 is combined with FeRAM technology that operates at the speed of RAM. The FeRAM technology is described in co-pending patent application Ser. No. 09/039,299 (pending) FERRO ELECTRIC MEMORY FOR A PROGRAMMABLE CONTROLLING DEVICE, filed Mar. 14, 1998 to Philip Barnett assigned to the same assignee which is hereby incorporated by reference. This patent application shows a microprocessor having its memory in FeRAM.

Figure 2:
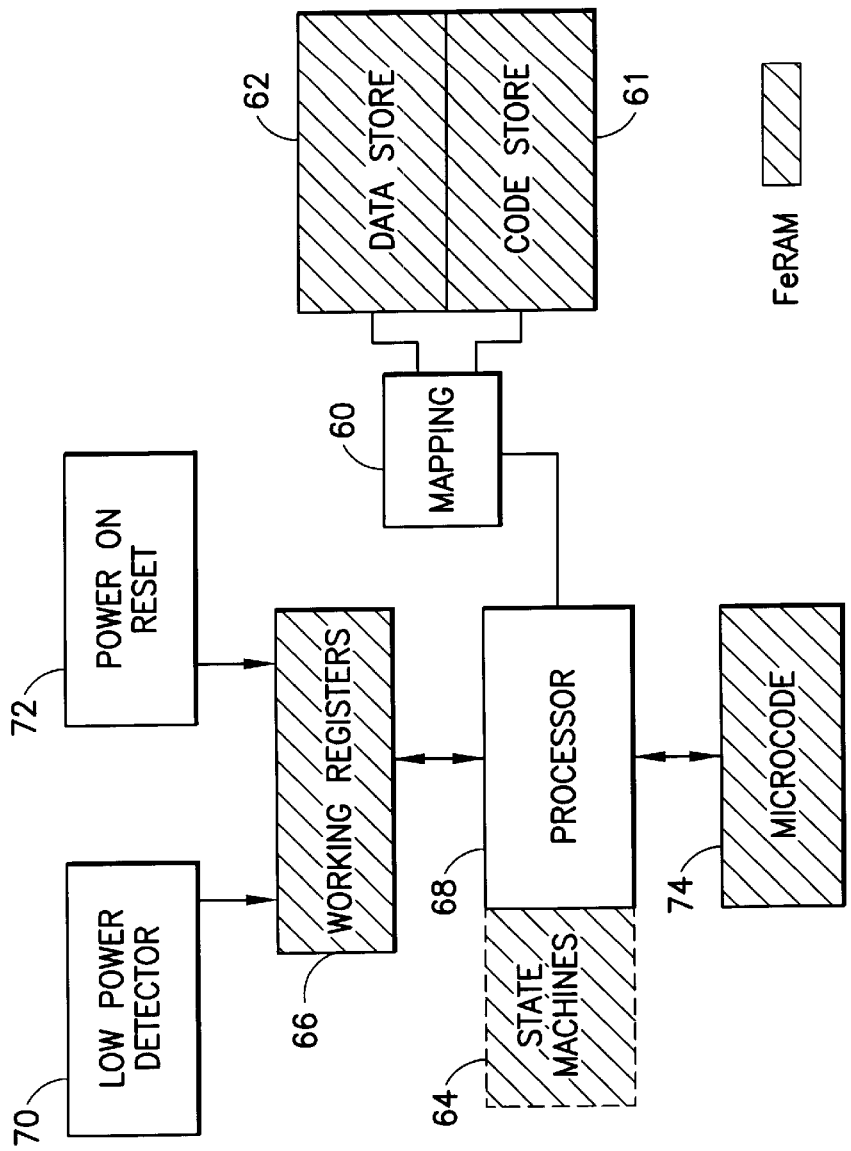
FIG. 2 is a simplified block diagram of the memory and processor of a generic microcontroller having its memory in FeRAM.

FIG. 2 shows a simplified block diagram of the memory and processor of a generic microprocessor as shown in the above patent application that has its memory in FeRAM. Some of the storage elements are memory mapped via memory mapping unit 60 into an array of FeRAM while others are replaced by FeRAM cell groups. A non-volatile code store 61 holding the controlling program is memory mapped into the array of FeRAM. This allows the controlling program to be maintained even if power is lost. In addition, since the FeRAM is programmable it is possible to change the controlling program in the field.

A data store 62 (data RAM) is used to store temporary data, for example, data being read in or out of processor 68. Data store 62 is memory mapped into the array of FeRAM. Implementing the data store 62 with non-volatile Ferro electric memory technology overcomes the loss of data stored during a power down and removes the need to incorporate additional non-volatile storage to duplicate information to allow for the loss of power.

State machines 64 and part of working registers 66 are both used by the processor 68. Registers 66 used by the processor 68 are memory mapped into the array of FeRAM. State machines 64 are FeRAM cell groups. Other registers 66 are used for peripherals and are FeRAM cell groups. Registers 66 used by the processor 68 are storage elements that hold data being manipulated by the processor in accordance with instructions being read from the code store 61. The exact state of the processor 68 is defined by the execution specific data that is contained within the registers 66 and state machines 64.

For example, the behavior of a microcontroller that has more than one level of priority interrupt needs to know which level of interrupt has been recognized so that it can recognize higher priority interrupts and ignore lower priority interrupts. These conditions are typically handled by state machines. If power is lost when 30 the state machine is not in the initialized condition the device looses the context it is working in. Even if the memory and register values are preserved, then the continued operation is unpredictable.

Implementing the registers 66 and state machines 64 with ferroelectric memory cells allows the execution specific data to be maintained in the event of power loss and eliminates the uncertainty. This makes it possible to stop the processor by removing the power, and resume the code execution in exactly the same place with no loss of data or configuration, when the power is reapplied. This is true also for the data for peripheral device registers. The only additional logic required is a power low detector 70, (or switch or other means) that detects low power and halts the processor at the end of the present instruction, and a power on reset 72, (or switch or other means) that ensures that the processor has its entire required signals stable before commencing execution. By halting the processor at the end of the instruction, the processor can be restarted with no loss of data. However, in another embodiment it is possible to stop the processor in the middle of the instruction and still be able to restart the processor with no loss of data. Additional layers of registers and state machines are required for the embodiment.

Microcode 74 contains information that defines how the processor 68 implements the program stored in code store 61. Microcode 74 is memory mapped into the array of ferroelectric memory cells. Since the ferroelectric memory cells are programmable, microcode 74 can be programmed after manufacture thus allowing the programmable control device to be dynamically changed to optimize its functionality.

The use of FeRAM for code store 61, data store 62, working registers 66, state machines 64 and microcode 74 has a number of advantages. First, it allows the implementation of zero power down modes, with no special processes or chip design needed. Second, it eliminates the need to add data critical nonvolatile stores to the microcontroller. Third, it reduces silicon area used by the memories due to the cell size efficiencies of ferroelectric memories. Fourth, it removes the need for large capacitor energy stores to preserve the integrity of data in battery powered systems when battery power is removed for battery replacement.

The use of an EPROM is not an option as a non-volatile storage component in most microprocessor applications because it has asymmetric read and write performance. The read may be done in nanoseconds but the write cycle may take milliseconds which is far to slow for a microprocessor.

Figure 3:
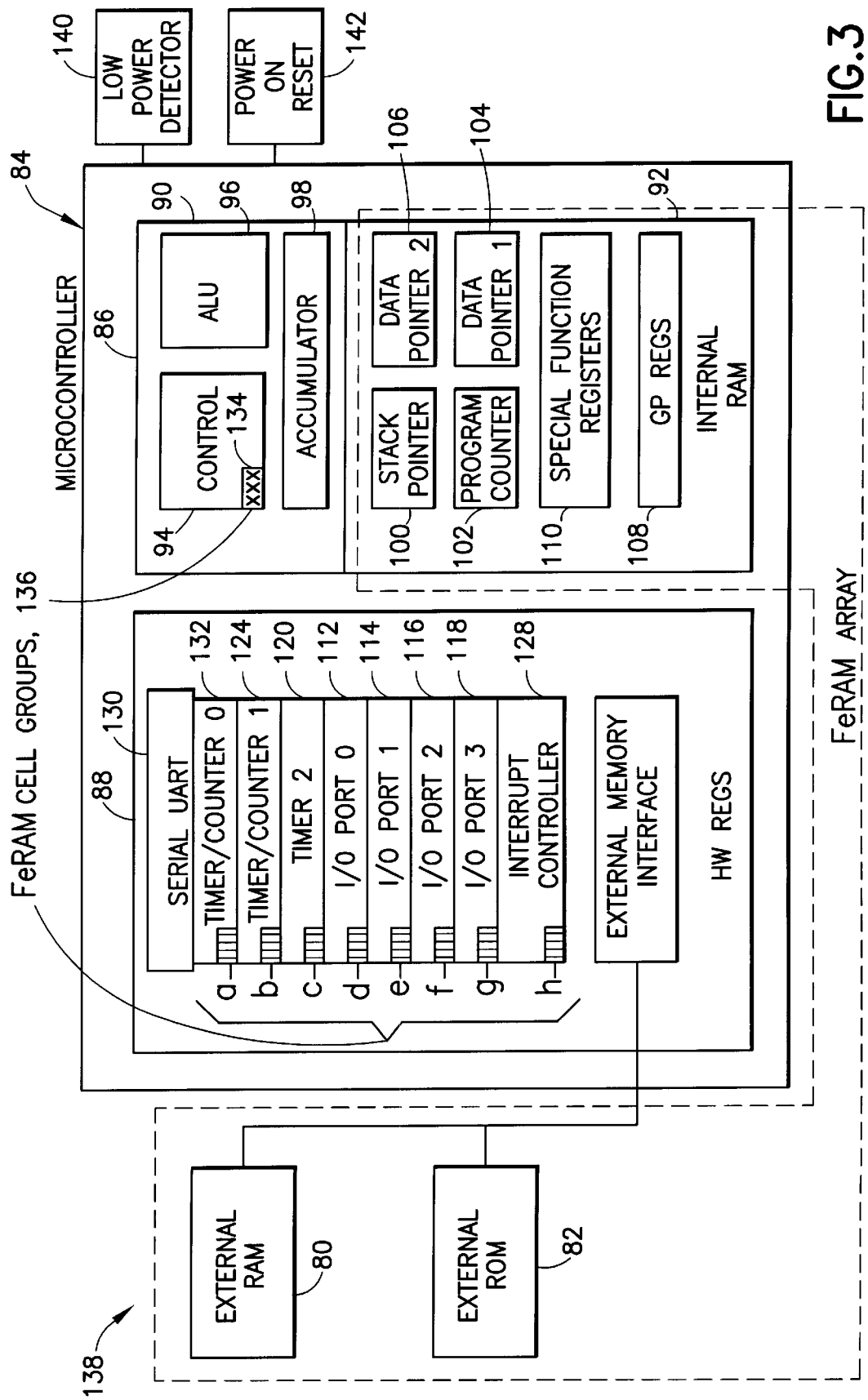
FIG. 3 is a detailed block diagram of the microcontroller disclosed in FIG. 2.

FIG. 3 is a detailed block diagram of a microcontroller such as that disclosed in FIG. 2 that could be for example an 8051 designed by Intel Corporation. In FIG. 3 external RAM 80 is used for data storage. External ROM 82 is non-volatile memory used to store the operating program for the microcontroller 84 which is made up of microprocessor 86 and peripherals 88. External RAM 80 and external ROM 82 may or may not be on the same chip as microcontroller 84. Microprocessor 86 is composed of processor 90 and internal RAM 92. Processor 90 is made up of control 94, arithmetic logic unit (ALU) 96 and accumulator 98. Control 94 receives the program from external ROM 82, executes the program instructions and controls all signal flow in microprocessor 86. ALU 96 performs arithmetic and logic operations for the microprocessor and provides an output to the accumulator 98. Internal RAM 92 provides the internal processor control registers needed by the control 94 and accumulator 98. These registers include stack pointer 100, program counter 102, and first and second data pointers 104,106, respectively, which are used by control 94 while executing program instructions. GP registers (General Purpose registers) 108 are the registers used in the accumulator 98. Although accumulator 98 physically contains GP registers 108, the registers are shown diagrammatically in internal RAM 92. The special function registers 110 are the registers for peripherals 88 and are physically located there although they are diagrammatically shown in internal RAM 92.

Peripherals 88 provide the pathway and communications from microprocessor 86 to external devices such as a display or keyboard. I/O ports 0,1,2,3 112–118, respectively, are for the input and output of information from microprocessor 86. Timer 2, timer/counter 0, and timer/counter 1 120–124, respectively, may have values that are externally entered. Interrupt controller 128 would normally be used in conjunction with an input from one of the other peripherals. The serial UART 130 is an interface which converts the serial input from an input device such as the keyboard to bytes that may be used by microprocessor 86.

There are three types of storage elements in the microcontroller; state machines 134 in control 94, registers 136a–h in peripherals 112–130, and the internal RAM 92. The registers in peripherals 112–130 are physically located in the peripherals but are shown as the special function registers 110 in internal RAM 92. These registers are loaded under program control by processor 90. They set the configuration of the peripherals. The state machines 134 in controller 94 describe the state of processor 90 at each point in time (i.e. processor context). As described previously, the remainder of the internal RAM 92 besides the special function registers 110 are internal process control registers which supports control 94, ALU 96, and accumulator 98.

All of the storage elements shown in microcontroller 84 are incorporated in FeRAM array 138 and FeRAM cell groups 136. Although the Special Function Registers 110 are shown in the FeRAM array 92 they are located in the peripherals 112–130 and are composed of FeRAM cell groups 136. Although the special function registers are hardware extensions to the architecture, they appear to the processor as memory. These ports are invariably programmable by the processor for flexibility. By incorporating FeRAM cell groups as the configuration storage elements, removing and restoring the power to the device has no effect on the continued operation.

The only additional circuitry required for the microprocessor if FeRAM were used would be a low power detector 140 and sufficient internal energy storage that would ensure that the complete instruction is executed and the processor is then stopped before the applied voltage goes so low that the devices operation becomes unpredictable. At power up, power on reset circuitry 142 would detect when the voltage is high enough to ensure successful operation, and that other essential signals CLK etc. are stable, the processing would then continue as if the voltage had never been removed.

The microcontroller shown in FIG. 3 show individual peripheral interfaces 112–130 as described in the prior art. It lacks a peripheral controller for connecting a selected peripheral device from a group of peripheral devices to the microprocessor 86. If a peripheral controller, for example, that shown in FIG. 1 were used with the microprocessor 86 of FIG. 3, an unexpected advantage would occur. The peripheral controller would be fabricated on a chip using FeRAM and would be able to store a configuration data set on the FeRAM. This would allow the peripheral controller to work with a configuration data set for one peripheral and be able to switch to a new peripheral on the fly. This would be possible because the microprocessor 86 would reload the FeRAM with the configuration data for the new peripheral while the first peripheral was still connected and in operation.

Figure 4:
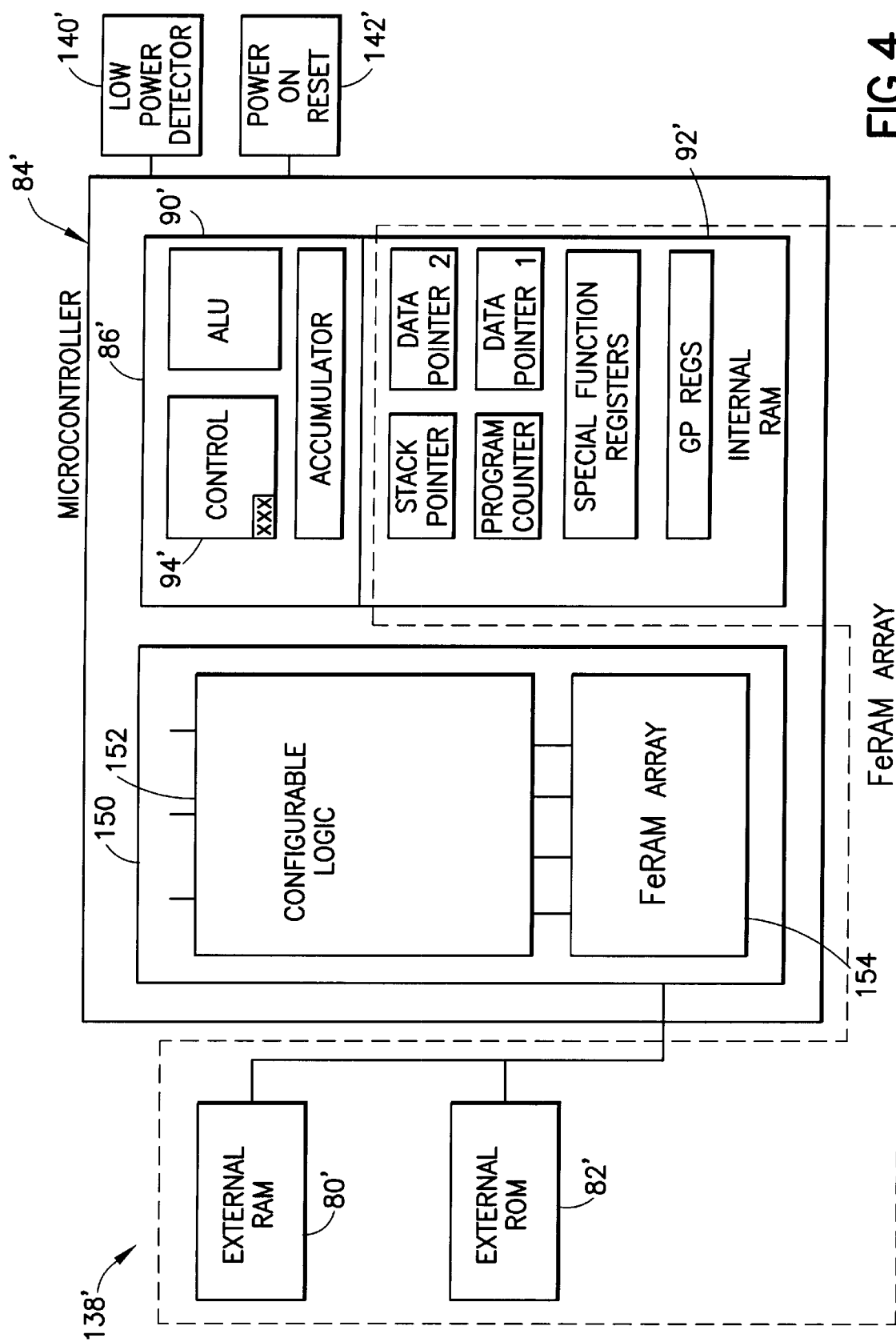
FIG. 4 shows the microcontroller of FIG. 3 incorporating the reconfigurable peripheral controller of FIG. 1.

FIG. 4 shows the microcontroller of FIG. 3 incorporating the peripheral controller of FIG. 1 with an FeRAM array to allow switching of configuration data sets into the peripheral controller on the fly. The peripheral controller with the FeRAM array is an enhanced peripheral controller. The microcontroller generally contains external RAM 80', external ROM 82', microprocessor 86', low power detector 140', power on reset 142', and enhanced peripheral controller 150 made up of reconfigurable peripheral controller 152 (for example, element number 14 of FIG. 1) and FeRAM array 154. Reconfigurable peripheral controller 152 comprises all of the logic functions and busses shown in element 14 of FIG. 1 and includes microprocessor interface 16, synchronization generator 24, clock generator 22, configurable logic array 18, communication flag port 28, communication registers 26 and programmable line drivers receivers 20. The microcontroller may be on one integrated circuit. Reconfigurable peripheral controller 152 is made from a programmable logic array (PLA) on a portion of the microcontroller chip. The logic functions of reconfigurable peripheral controller 152 are programmed into the PLA. FeRAM array 154 contains data that defines the logic programmed into reconfigurable peripheral controller 152. In operation, a microprocessor 86 reads the data into FeRAM array 154 and cooperates with the FeRAM to configure the data into the PLA so as to create reconfigurable peripheral controller 152. The reconfigurable peripheral controller 152 is configured for one of the peripherals and as described with respect to FIG. 1 it may be reconfigured with another configuration data set to switch to another peripheral.

The advantage of the FeRAM is that it operates at the speed of RAM. Microprocessor 86 reads new configuration data sets for different peripherals into FeRAM very quickly. Then the microprocessor 86 cooperates with the FeRAM to program the configuration data set into the reconfigurable peripheral controller 152 on the fly so that the new peripheral may be used.

Other advantages of using FeRAM for the enhanced peripheral controller 150 are that it is non-volatile and reprogrammable. RAM has the disadvantage that it is volatile and loses data during a power down. With FeRAM if power is shut down the microprocessor may be started up where it left off without rebooting. The use of an EPROM is not an option for the enhanced peripheral controller 150 because it has asymmetric read and write performance. The read may be done in nanoseconds but the write cycle may take milliseconds which is far to slow for a microprocessor and reconfigurable peripheral controller. The data to be changed in the FeRAM array could not be done on the fly. ROM may not be used for the enhanced peripheral controller 150 because ROM may only be written once and would not allow data changes to be made.

The advantages of using FeRAM array 154 in new inventive peripheral controller 150 complement the advantages of using FeRAM for the memory in the microcontroller as detailed previously for FIGS. 2 and 3. The memory in the microcontroller is non-volatile, reprogrammable and operates with the speed of RAM. These same advantages with FeRAM array 154 allow the multiple data set peripheral controller to work at the speed of the microprocessor and create a microprocessor that reconfigures the enhanced peripheral controller so that multiple peripherals may be switched on the fly as the microcontroller operates.

While the preferred embodiments of the invention have been shown and described, numerous variations and alternative embodiments will occur to those skilled in the art. Accordingly, it is intended that the invention be limited only in terms of the appended claims.

I claim:

1. An enhanced peripheral controller communicating between a microprocessor and multiple peripherals, said enhanced peripheral controller comprising, an FeRAM capable of receiving a configuration data set for one of said peripherals selected to communicate with said microprocessor, a PLA cooperating with said FeRAM to receive said configuration data set for said selected peripheral, said microprocessor programming said configuration data set into said PLA on the fly to create a reconfigurable peripheral controller to provide communication between said microprocessor and said selected peripheral, said reconfigurable peripheral controller being reconfigured on the fly each time a new one of said peripherals is selected to communicate with said microprocessor.

2. The enhanced peripheral controller of claim 1 in which said microprocessor is capable of reading a different configuration data set for each of said multiple peripherals into said FERAM on the fly as said microprocessor operates.

3. A microcontroller capable of being connected to one of multiple peripherals, said microcontroller comprising, a microprocessor, an FeRAM capable of receiving a configuration data set for one of said peripheral selected to communicate with said microprocessor, a PLA cooperating with said FeRAM to receive said configuration data set for said selected peripheral, said microprocessor programming said configuration data set into said PLA on the fly to create a reconfigurable peripheral controller to provide communication between said microprocessor and said selected peripheral, said reconfigurable peripheral controller being reconfigured on the fly each time a new one of said peripherals is selected to communicate with said microprocessor.

4. The microcontroller of claim 3 in which said microprocessor is capable of reading a different configuration data set for each of said multiple peripherals into said FeRAM on the fly as said microprocessor operates.

5. An enhanced peripheral controller communicating between a microprocessor and multiple peripherals comprising, an FeRAM capable of receiving a configuration data set for one of said peripherals selected to communicate with said microprocessor, a reconfigurable peripheral controller capable of being programmed onto a programmable logic array from a configuration data set received from said FERAM for said selected one of said multiple peripherals, said reconfigurable peripheral controller providing communication between said microprocessor and said selected one of said multiple peripherals, said reconfigurable peripheral controller being reconfigured on the fly as said microprocessor operates each time another one of said multiple peripherals is selected to communicate with said microprocessor.

6. The enhanced peripheral controller of claim 5 in which said microprocessor is capable of reading a different configuration data set for each of said multiple peripherals into said FeRAM on the fly as said microprocessor operates.

7. A microcontroller capable of being connected to one of multiple peripherals comprising, a microprocessor, an FeRAM capable of receiving a configuration data set for one of said peripherals selected to communicate with said microprocessor, a reconfigurable peripheral controller capable of being programmed onto a programmable logic array from a configuration data set received from said FeRAM for said selected one of said multiple peripherals, said reconfigurable peripheral controller providing communication between said microprocessor and said selected one of said multiple peripherals, said reconfigurable peripheral controller being reconfigured on the fly as said microprocessor operates each time another one of said multiple peripherals is selected to communicate with said microprocessor.

8. The enhanced peripheral controller of claim 7 in which said microprocessor is capable of reading a different configuration data set for each of said multiple peripherals into said FeRAM on the fly as said microprocessor operates.

9. The microcontroller of claim 3 including, a processor within said microprocessor, one or more state machines within said processor to indicate the status of said processor, said state machines made up of non-volatile ferroelectric memory cells.

10. The microcontroller of claim 9 including a detector cooperating with said microprocessor to detect low power to said microprocessor.

11. The microcontroller of claim 10 including a switch cooperating with said processor to halt said processor at the end of an instruction when said low power is detected.

12. The microcontroller of claim 10 including a switch cooperating with said processor to halt said processor during an instruction when said low power is detected.

13. The microcontroller of claim 3 including one or more internal processor control registers cooperating with said microprocessor that hold data being manipulated by said microprocessor, said internal processor control registers made up of non-volatile ferroelectric memory cells.

14. The microcontroller of claim 13 in which said internal processor control registers include a stack pointer, a program counter, and one or more data pointers.

15. The microcontroller of claim 14 including a code store cooperating with said microprocessor, said code store containing a program to control said microprocessor, said code store made up of non-volatile ferroelectric memory cells.

* * * * *